United States Patent
Enomoto

(10) Patent No.: US 6,714,254 B2
(45) Date of Patent: Mar. 30, 2004

(54) METHOD OF DISPLAYING CHARACTER DATA IN DIGITAL TELEVISION BROADCASTING RECEIVER

(75) Inventor: Mitsunobu Enomoto, Nara (JP)

(73) Assignee: Sanyo Electric Co., Ltd., Osaka (JP)

( * ) Notice: Subject to any disclaimer, the term of this patent is extended or adjusted under 35 U.S.C. 154(b) by 447 days.

(21) Appl. No.: 09/866,753

(22) Filed: May 30, 2001

(65) Prior Publication Data

US 2002/0019989 A1 Feb. 14, 2002

(30) Foreign Application Priority Data

Jun. 1, 2000 (JP) ........................................ 2000-164480

(51) Int. Cl.$^7$ .................. H04N 5/445; H04N 7/01; H04N 5/46
(52) U.S. Cl. ................... 348/564; 348/569; 348/556; 348/600
(58) Field of Search ................ 348/563, 445, 348/564, 581, 589, 600, 465, 569, 553, 556; 725/139; 382/298, 301; 345/471, 472.3, 472.2, 636, 551, 556, 26, 23, 25; H04N 5/445, 5/50, 7/01, 9/74, 5/46

(56) References Cited

U.S. PATENT DOCUMENTS

| | | | |
|---|---|---|---|
| 5,347,313 A | 9/1994 | Choi | 348/445 |
| 5,467,142 A * | 11/1995 | Ichinokawa | 348/556 |
| 5,546,131 A * | 8/1996 | Terry | 348/564 |
| 6,630,966 B1 * | 10/2003 | Tournier | 348/569 |

FOREIGN PATENT DOCUMENTS

| | | | |
|---|---|---|---|
| EP | 0343539 A | | 11/1989 |
| JP | 6-233208 | | 8/1994 |
| JP | 06245093 | * | 9/1994 |
| JP | 08161430 | * | 6/1996 |
| JP | 8-322046 | | 12/1996 |

OTHER PUBLICATIONS

Korean Patent No. 9501554, *Abstract Only*.
www.provideoandtape.com/news.htm, "Professional Video & Tape", PC Scribe, Mar. 17, 2001, p. 1.

* cited by examiner

*Primary Examiner*—Sherrie Hsia
(74) *Attorney, Agent, or Firm*—Arent Fox Kintner Plotkion & Kahn

(57) ABSTRACT

In a method of displaying character data in a digital television broadcasting receiver in a case where the aspect ratio of a monitor differs from the aspect ratio of a received image, the method comprises the steps of selecting, with respect to the size of characters, the size designated by the character data proportionally depending on the aspect ratio of the image and the aspect ratio of the monitor, and selecting, out of the sizes of fonts of the receiver, the size which is not more than and is closest to the corrected size, and correcting, with respect to the display position of the characters, the display position designated by the character data proportionally depending on the aspect ratio of the image and the aspect ratio of the monitor.

2 Claims, 4 Drawing Sheets

METHOD OF DISPLAYING CHARACTER DATA IN DIGITAL TELEVISION BROADCASTING RECEIVER

BACKGROUND OF THE INVENTION

1. Field of the Invention

The present invention relates to a method of displaying character data in a digital television broadcasting receiver.

2. Description of the Prior Art

In recent years, television broadcasting has been digitized. In BS digital broadcasting which is scheduled to start at the end of this year, it is possible to broadcast, in addition to images (SD; Standard Definition) having a conventional resolution, size, and aspect ratio (4:3), images (HD; High Definition) having a higher resolution and having a different size and aspect ratio (16:9) on the same channel.

Therefore, digital television broadcasting receivers have the function of correcting images which differ in resolution proportionally depending on the aspect ratio of a monitor in the receiver and displaying the corrected images.

In the digital broadcasting, not only an image but also character data to be displayed over the image, for example, subtitles is fed with the character data multiplexed on the image. The digital broadcasting receiver has the function of analyzing the fed character data and displaying characters with the characters overlapped with the image at a designated position in a designated size and a designated color.

In the digital broadcasting, images having different aspect ratios are fed. Accordingly, the display size and the display position of character data to be overlapped with the image are also fed as a display size and a display position which use as a basis a display range corresponding to the aspect ratio of the image. On the other hand, the aspect ratio of the monitor in the receiver is fixed. When the image having an aspect ratio different from the aspect ratio of the monitor is received on the side of the receiver, therefore, the image must be corrected such that the aspect ratio thereof is adaptable to the aspect ratio of the monitor, and the character data must be similarly corrected.

When the characters are enlarged or reduced similarly to the image, however, the characters are crushed and are difficult to read. Further, when the characters are enlarged or reduced similarly to the image, on-screen displays respectively corresponding to the aspect ratios of all the images are required.

In order to avoid this, a font corresponding to the character size after the correction may be used. In the case, however, font data in a lot of sizes must be stored in a memory.

SUMMARY OF THE INVENTION

An object of the present invention is to provide a method of displaying character data in a digital television broadcasting receiver capable of displaying characters over an image having an aspect ratio different from the aspect ratio of a monitor in the receiver using only an on-screen display corresponding to the aspect ratio of the monitor.

In a method of displaying character data in a digital television broadcasting receiver in a case where the aspect ratio of a monitor differs from the aspect ratio of a received image, the method according to the present invention is characterized by comprising the steps of correcting, with respect to the size of characters, the size designated by the character data proportionally depending on the aspect ratio of the image and the aspect ratio of the monitor, and selecting, out of the sizes of fonts of the receiver, the size which is not more than and is closest to the corrected size; and correcting, with respect to the display position of the characters, the display position designated by the character data proportionally depending on the aspect ratio of the image and the aspect ratio of the monitor.

It is preferable that the display position is corrected, with respect to a string of characters to be continuously displayed in the character data, only with respect to the character at the head of the character string, and the display position is moved by an amount of movement corresponding to character spacing previously determined depending on the selected character size with respect to the character subsequent to the character at the head.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
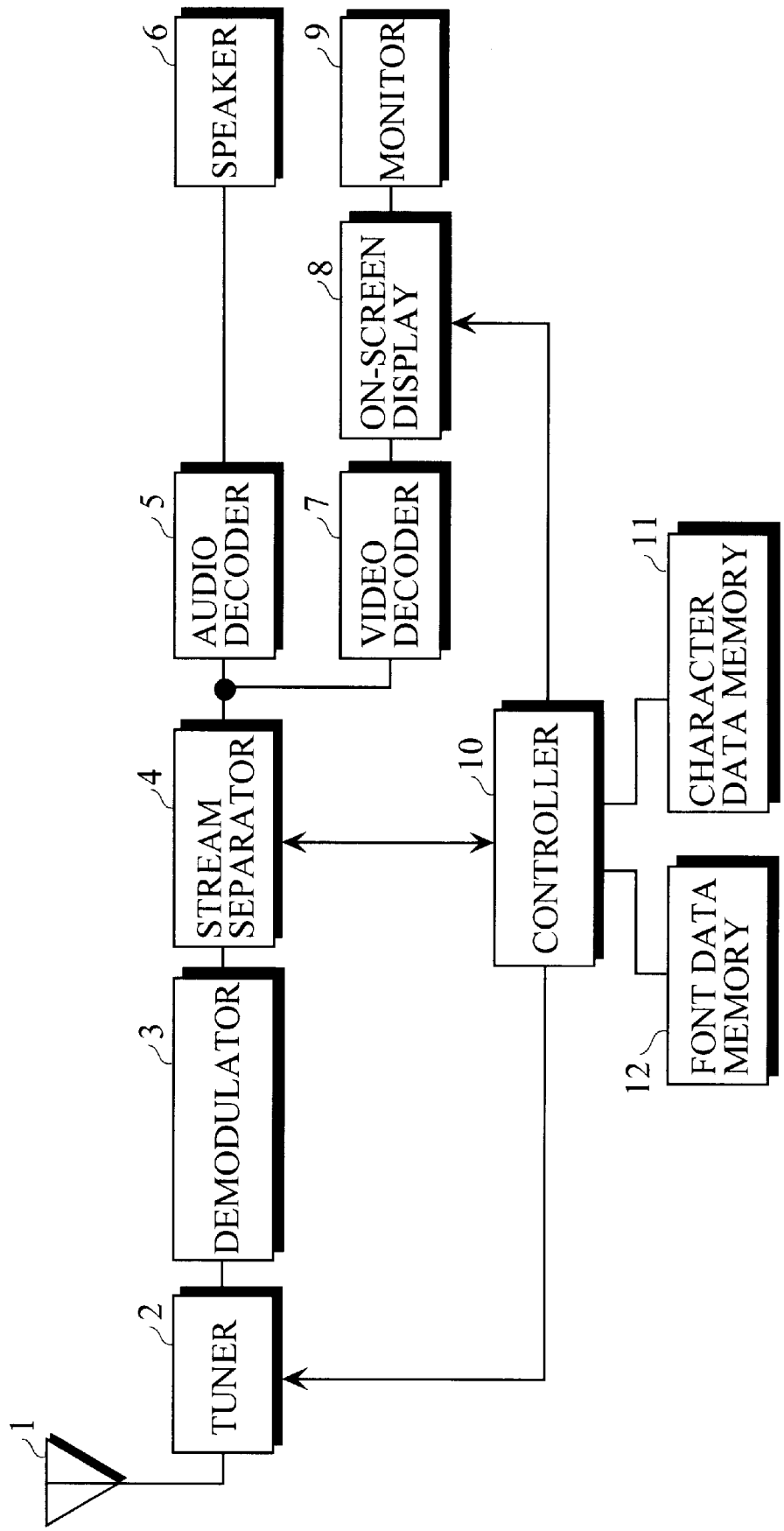
FIG. 1 is a block diagram showing the configuration of a digital television broadcasting receiver.

Referring now to the drawings, an embodiment of the present invention will be described.

FIG. 1 illustrates the configuration of a digital television broadcasting receiver.

A video signal accepted from an antenna 1 is fed to a demodulator 3 after only a channel having a particular frequency is tuned in to by a tuner 2. A digital broadcasting signal is fed in the form of a transport stream (hereinafter referred to as a stream), and information related to a plurality of programs and each of the programs, character data to be overlapped with an image, and so forth are multiplexed thereon.

Only particular data is extracted from the stream demodulated by the demodulator 3 by a stream separator 4. Extracted video data is fed to a video decoder 7, and extracted audio data is fed to an audio decoder 5. Since the video data is compressed so as to be efficiently transmitted, the video data is expanded by the video decoder 7 and is then displayed by a monitor 9. Since the audio data is also similarly compressed so as to be efficiently transmitted the audio data is expanded and is then outputted by a speaker 6.

When the aspect ratio of the video data differs from the aspect ratio of the monitor 9, the video data is expanded by the video decoder 7 and at the same time, is corrected such that the aspect ratio thereof is adaptable to the aspect ratio of the monitor 9, and is then displayed by the monitor 9.

A controller 10 controls the tuner 2 and the stream separator 4, to control the receiver so as to display a particular program on a particular channel.

Furthermore, the information related to the programs and the character data such as subtitles are extracted by the stream separator 4 and are fed to the controller 10.

In the controller 10, the character data fed from the stream separator 4 is stored in a character data memory 11 to analyze the contents thereof, font information is read from a font data memory 12 in accordance with the contents, and characters are displayed by an on-screen display 8. In the on-screen display 8, the characters are displayed by the monitor 9 with the characters overlapped with the image from the video decoder 7.

Description is now made of processing for character data such as subtitles.

Figure 2:
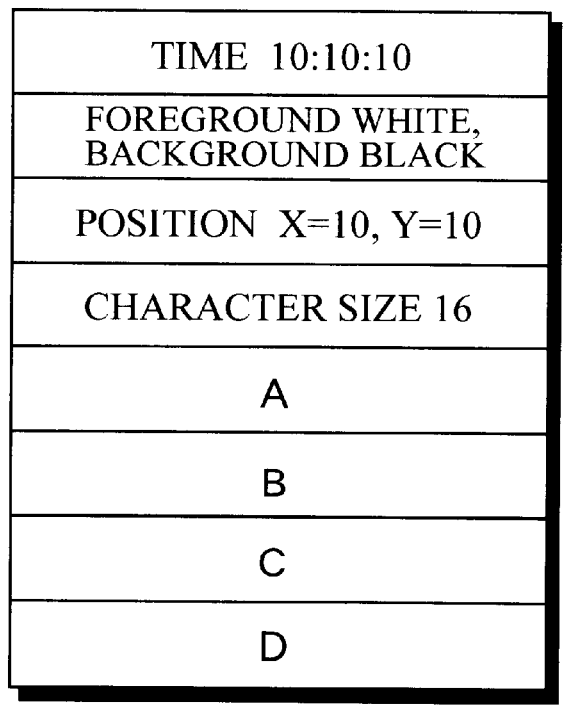
FIG. 2 is a schematic diagram showing a specific example of character data.

FIG. 2 illustrates an example of the character data.

The character data includes data representing the displayed characters and data related to the size of the characters, the color of the characters, the position where the characters are displayed, the time when the characters are displayed, and so forth. The controller 10 performs on-screen display in accordance with the contents. The display position is represented by a coordinate system taking the X-axis in the transverse direction and the Y-axis in the longitudinal direction.

Figure 3:
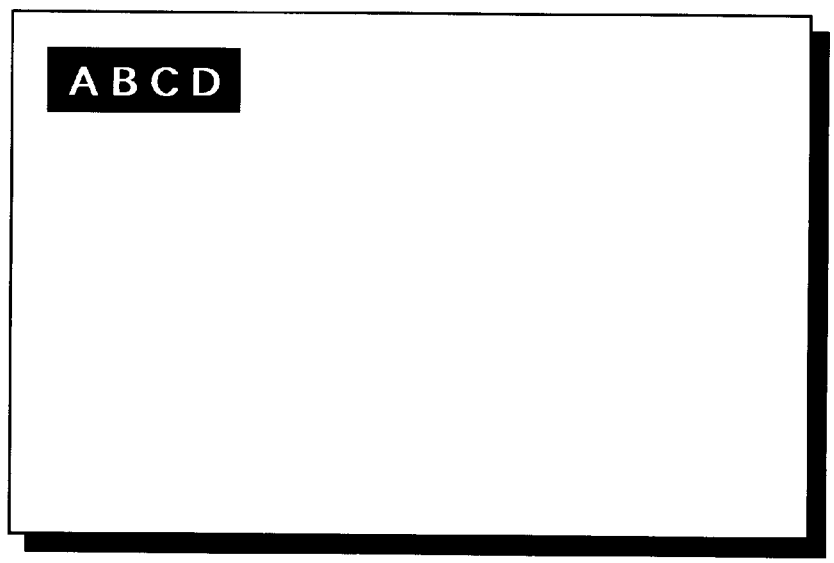
FIG. 3 is a schematic view showing an example of display of character data.

In the example of the character data shown in FIG. 2, it is indicated that characters "ABCD" whose foreground and background are respectively white and black are displayed at 10:10:10 in a character size of 16 dots at a position spaced 10 dots apart from the left and spaced 10 dots apart from the top. FIG. 3 illustrates an example of display of the character data shown in FIG. 2.

Description is now made of a method of displaying images having different aspect ratios and a method of displaying character data to be overlapped with each of the images.

Figure 4:
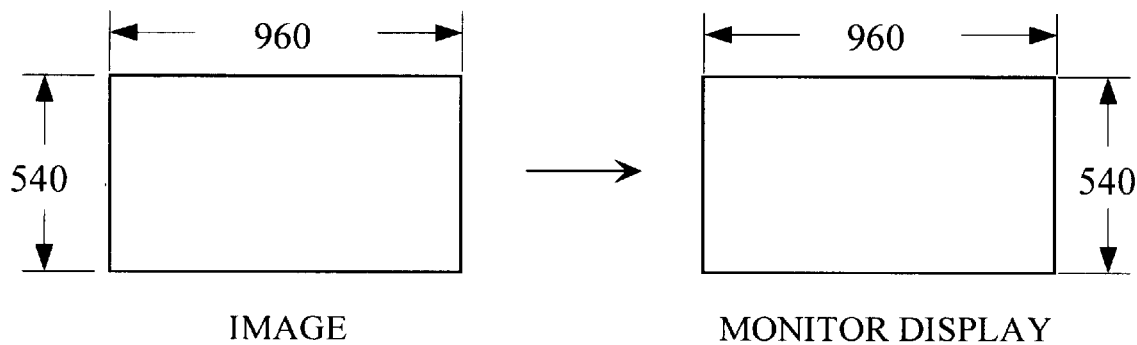
FIGS. 4(a), 4(b) and 4(c) are schematic views showing images having different aspect ratios and examples of display of the images on a monitor.
Figure 4:
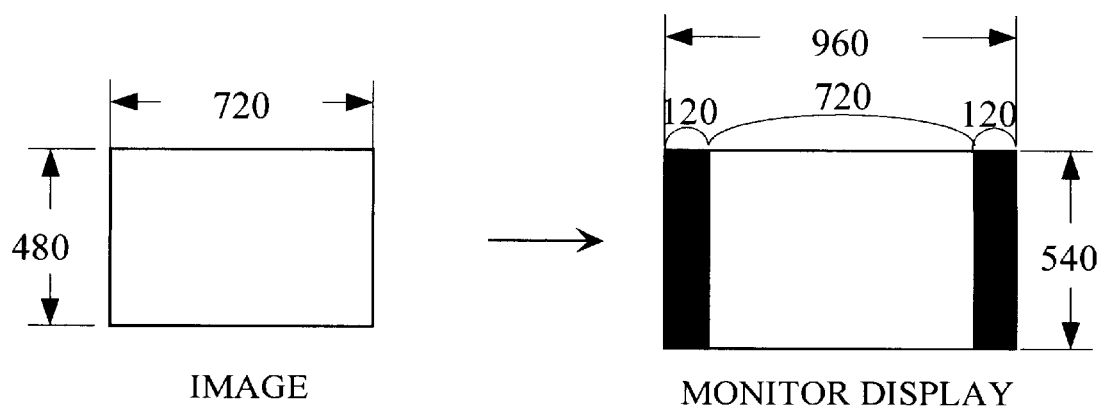
Figure 4:
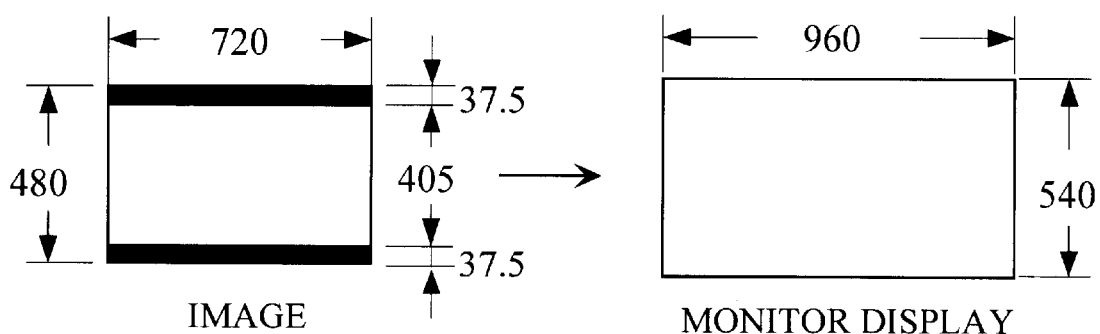

FIGS. 4(a), 4(b) and 4(c) illustrate the respective aspect ratios of images and examples of display on the monitor.

The aspect ratio of the monitor 9 in the receiver shall be 16:9 (960:540). FIG. 4(a) illustrates an example of display in a case where a received image is an HD image having an aspect ratio of 16:9. The image is displayed without being corrected.

FIG. 4(b) illustrates an example of display in a case where a received image is an SD image having an aspect ratio of 4:3. No image is displayed in right and left areas where there is no video data on the monitor 9.

FIG. 4(c) illustrates an example of display in a case where a received image is an SD image having an aspect ratio of 4:3 but substantially has an aspect ratio of 16:9 because there is no video data in its upper and lower parts. That is, only a portion having an aspect ratio of 16:9 where video data exists in the SD image having an aspect ratio of 4:3 is extracted, and is displayed in enlarged fashion on the whole area of the monitor 9.

Fed as the character data is one produced on the basis of a display range corresponding to 960 dots by 540 dots in the case of the HD image having an aspect ratio of 16:9, while being one produced on the basis of a display range corresponding to 720 dots by 480 dots in the case of the SD image having an aspect ratio of 4:3.

Since the aspect ratio of the monitor 9 in the receiver is 16:9, the on-screen display 8 has a configuration corresponding to 960 dots by 540 dots.

When the received image is the HD image having an aspect ratio of 16:9, as shown in FIG. 4(a), the character data need not be corrected. On the other hand, when the received image is the SD image having an aspect ratio of 4:3, as shown in FIG. 4(b) or 4(c), the character data must be corrected.

Description is made of a method of correcting the character size. As to the character size, it is considered that the size designated by the character data is corrected proportionally depending on the aspect ratio of the image and the aspect ratio of the monitor, and a font in the corrected size is used. However, the method has the disadvantage in that the capacity of the memory in the receiver is increased when the number of types of fonts is increased, and characters are crushed and are difficult to see in a case where the enlargement ratio is not an integer and a case where the enlargement ratio in the longitudinal direction and the enlargement ratio in the transverse direction differ from each other when front data normally used is enlarged or reduced.

In the present embodiment, the size designated by the character data is corrected proportionally depending on the aspect ratio of the image and the aspect ratio of the monitor, and the size which is not more than and is closest to the corrected size is selected out of the sizes of the fonts of the receiver.

Description is made of method of determining the display position of characters. As to the display position of the characters, the display position designated by the character data is corrected proportionally depending on the aspect ratio of the image and the aspect ratio of the monitor. The display position designated by the character data is taken as (x, y).

In the case shown in FIG. 4(b), a display position x' in the transverse direction after the correction is taken as (x+120). Further, a display position y' in the longitudinal direction after the correction is taken as (y+y/8). This is derived from y'=y+{(540−480)/480}y.

In the case shown in FIG. 4(c), a display position x' in the transverse direction after the correction is taken as (x+x/3). This is derived from x'=x+{(960−720)/720}y. Further, a display position y' in the longitudinal direction after the correction is taken as (y+37.5)+y/3}. This is derived from y'=(y+37.5)+{(540−405)/405}y. Since a coordinate value must be an integer, the figures after the decimal point are rounded down.

Figure 5:
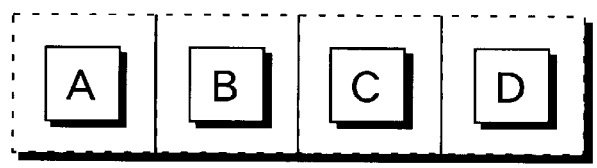
FIG. 5 is a schematic view showing an example of display of characters.

FIG. 5 illustrates an example of display of characters which have been corrected in the above-mentioned manner.

A frame indicated by a dotted line in FIG. 5 represents a character display range in a case where the size designated by the character data is corrected proportionally depending on the aspect ratio of the image and the aspect ratio of the monitor. A frame indicated by a solid line in FIG. 5 represents a character display range in a case where the font of the size, out of the sizes of the fonts of the receiver, which is not more than and is closest to the size obtained by correcting the size designated by the character data proportionally depending on the aspect ratio of the image and the aspect ratio of the monitor is used.

As shown in FIG. 5, characters in a smaller size than the size obtained by correcting the size designated by the character data proportionally depending on the aspect ratio of the image and the aspect ratio of the monitor are displayed. Accordingly, the characters are displayed at the center of the character display range in a case where the designated size is corrected proportionally depending on the aspect ratio of the image and the aspect ratio of the monitor.

In the display shown in FIG. 5, however, spacing between the characters is large. Accordingly, there is a bad balance between the displayed characters. In the correction according to the present embodiment, the results of calculation are processed by integers. Therefore, an error corresponding to one dot may occur. As a result, the spacing between the characters may not, in some cases, be constant.

Figure 6:
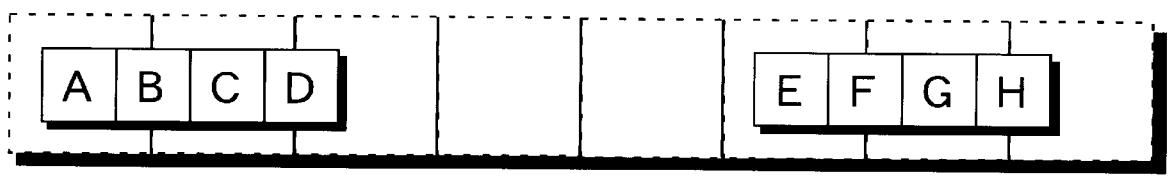
FIG. 6 is a schematic view showing an example of display of characters.

As shown in FIG. 6, the same position correction as that in the above-mentioned method is made with respect to the first character "A" in a string of continuous characters, and the display position is moved in correspondence with character spacing previously determined depending on the character size after the correction with respect to the subsequent characters "B", "C" and "D", thereby displaying the characters with the character spacing corresponding to the character size. The characters are thus displayed with the spacing corresponding to the character size. Accordingly, the characters are easy to see.

When a string of characters which are not continued from a character string "ABCD" that is, a character string "EFGH" whose position is newly designated follows "ABCD" the display position is corrected again only with respect to the first character, and the display position is moved in correspondence with the character spacing previously determined depending on the character size after the correction with respect to the subsequent characters.

Although in the above-mentioned embodiment, subtitles can be displayed over the image having a different aspect ratio from the aspect ratio of the monitor in the receiver using only an on-screen display corresponding to the aspect ratio of the monitor. Further, the display can be performed without enlarging or varying the character spacing by the correction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a method of displaying character data in a digital television broadcasting receiver in a case where the aspect ratio of a monitor differs from the aspect ratio of a received image, the method comprising the steps of:

correcting, with respect to the size of characters, the size designated by the character data proportionally depending on the aspect ratio of the image and the aspect ratio of the monitor, and selecting, out of the sizes of fonts of the receiver, the size which is not more than and is closest to the corrected size; and correcting, with respect to the display position of the characters, the display position designated by the character data proportionally depending on the aspect ratio of the image and the aspect ratio of the monitor.

2. The method according to claim 1, further comprising correcting, with respect to a string of characters to be continuously displayed in the character data, the display position only with respect to the character at the head of the character string, and moving the display position by an amount of movement corresponding to character spacing previously determined depending on the selected character size with respect to the character subsequent to the character at the head.

* * * * *